(No Model.)
C. W. WERNER.
GLASS CUTTING APPARATUS.
No. 411,764. Patented Sept. 24, 1889.
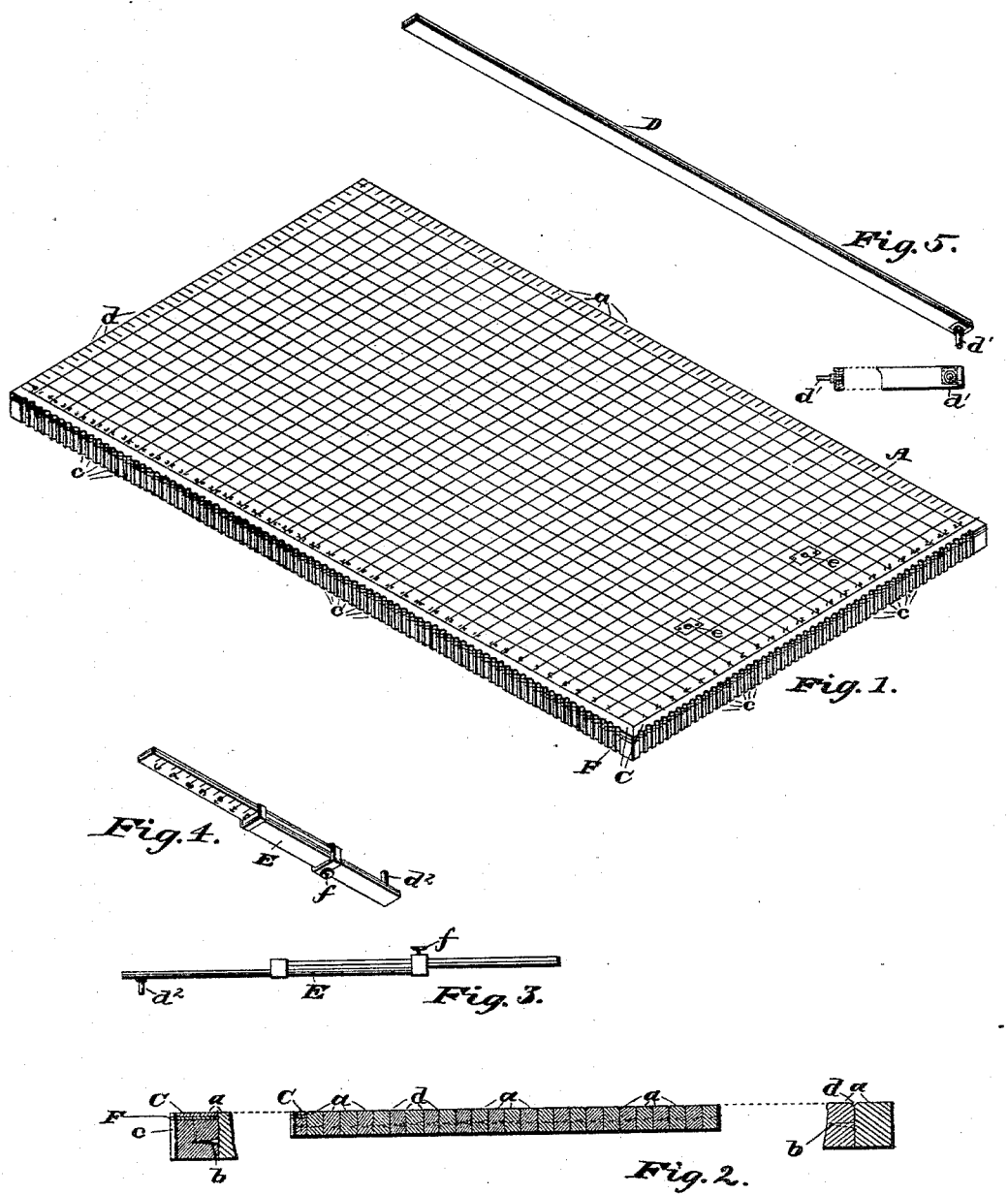
Witnesses
Ev. G. Lane
Fred. C. Slagel
Inventor
Charles W. Werner
By Bond & Wise
Attorneys

UNITED STATES PATENT OFFICE.

CHARLES W. WERNER, OF CANTON, OHIO.

GLASS-CUTTING APPARATUS.

SPECIFICATION forming part of Letters Patent No. 411,764, dated September 24, 1889.

Application filed May 27, 1889. Serial No. 312,332. (No model.)

*To all whom it may concern:*

Be it known that I, CHARLES W. WERNER, a citizen of the United States, residing at Canton, in the county of Stark and State of Ohio, have invented certain new and useful Improvements in Glass-Cutting Apparatus; and I do hereby declare that the following is a full, clear, and exact description of the same, reference being had to the annexed drawings, making a part of this specification, and to the letters and figures of reference marked thereon, in which—

Figure 1 is a view of the cutting-board. Fig. 2 is a sectional view showing portions broken away and enlarged to better illustrate the construction. Fig. 3 is an edge view of the gage designed and calculated to be used in cutting a circle or segment. Fig. 4 is a view of the gage shown in a different position. Fig. 5 is a view of the straight-edge.

The present invention has relation to glass-cutting apparatus; and it consists in the different parts and combination of parts hereinafter described, and particularly pointed out in the claims.

Similar letters of reference indicate corresponding parts in all the figures of the drawings.

In the accompanying drawings, A represents the board proper, which may be constructed of any desired size and is substantially of the form shown in Fig. 1. This board A is composed of narrow strips $a$, which strips are placed side by side and held together by the pins $b$. These strips are also securely glued together. The board A is provided upon one end and side with the metallic strips C, said strips being so adjusted that their top or upper side will be flush with the working-face of the board A. One end and side of the board A are provided with the grooves $c$, said grooves extending through the metallic strips C. The top or upper side of the board A is provided with the grooves $d$, which cross each other at right angles, as illustrated in Fig. 1. These grooves $d$ are located opposite and in line with the grooves $c$, and are of a different color from the balance of the board A.

The straight-edge D is substantially of the form shown in Fig. 5, and is provided with the pin $d'$, which pin is for the purpose of engaging one of the grooves $c$, and thereby prevent the straight-edge from becoming displaced while a pane of glass is being cut by a diamond or other instrument. It will be seen that by providing the grooves $c$ and locating them as shown in Fig. 1 the straight-edge D can be quickly and easily adjusted to any desired point upon the board and securely held in proper position by means of the pin $d'$.

For the purpose of cutting a segment or a circle the gage E is provided, one end of said gage being securely held at a given point by means of the pin $d^2$ and the apertures $e$. It will be seen that the apertures $e$ may be located at any desired point on the face of the board A.

For the purpose of cutting segments or circles of different diameters the gage E is formed in two pieces and is adjustable to any desired length. Said gage is securely held at any desired point of adjustment by means of the set-screw $f$. The end and side of the board A, provided with the metallic strips C, are laid off in inches and fractions thereof and properly numbered, as illustrated in Fig. 1.

It will be seen that by providing the grooves $d$ and coloring them the pane of glass designed to be cut can be placed upon the board and adjusted to any desired groove at the point where the pane is to be cut.

For the purpose of securely attaching the metallic strips C to the board proper, the paper strips F are glued to said metallic strips and the paper glued to the board A. The paper strips are used for the purpose of causing the glue to adhere to the metallic strips C, as glue will not adhere to wood and metal when they come in contact one with the other.

Having fully described my invention, what I claim as new, and desire to secure by Letters Patent, is—

1. The board A, composed of strips $a$, the grooves $c$, located upon the side and end of said board, the grooves $d$, crossing each other at right angles, and the straight-edge D, provided with the pin $d'$, adapted to engage the grooves $c$, substantially as and for the purpose set forth.

2. The board A, provided with the grooves $c$, and the colored grooves $d$, located in line with the grooves $c$, and the straight-edge D, provided with the pin $d'$, adapted to engage the grooves $c$, substantially as and for the purpose specified.

In testimony that I claim the above I have hereunto subscribed my name in the presence of two witnesses.

CHARLES W. WERNER.

Witnesses:
L. FRANCIS,
F. W. BOND.